Jan. 17, 1939.  R. C. SCOTT  2,144,549
METHOD AND MEANS FOR STARTING SYNCHRONOUS MOTORS
Filed July 5, 1932
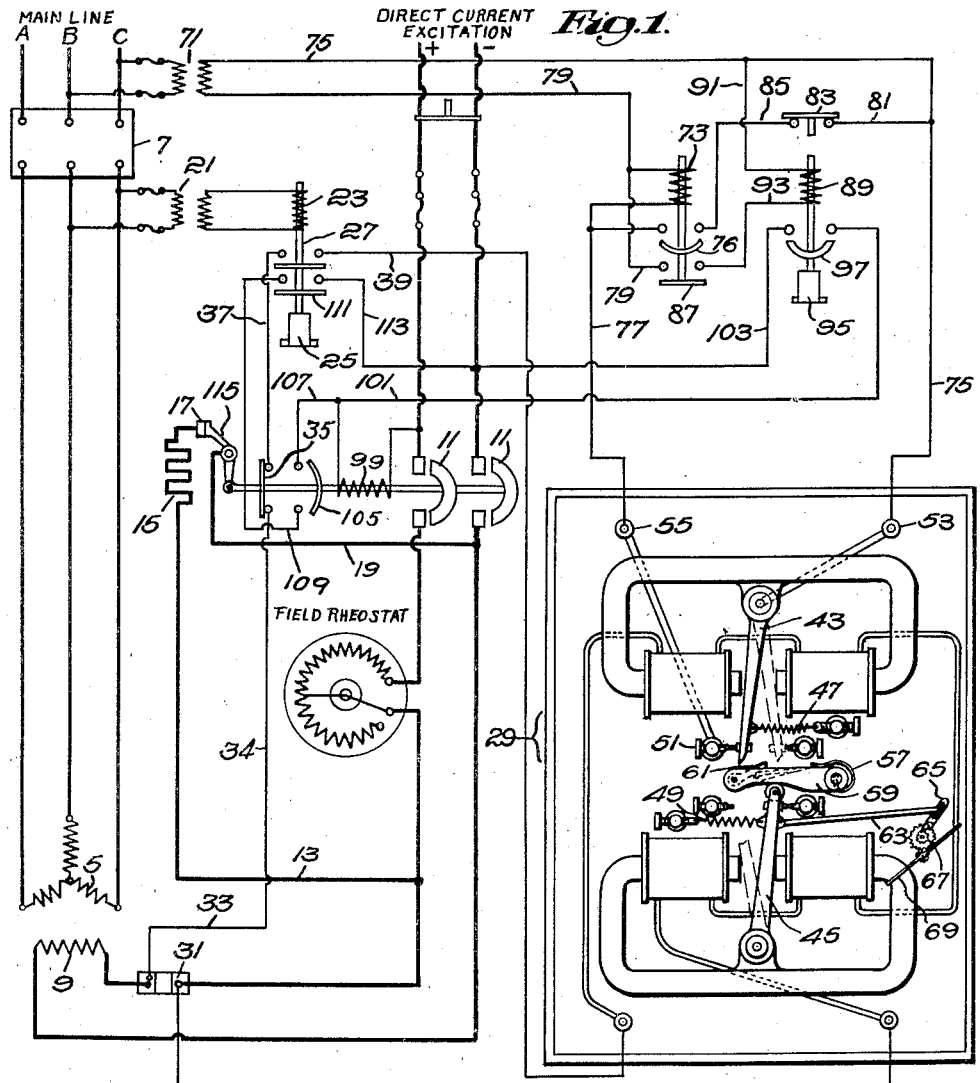
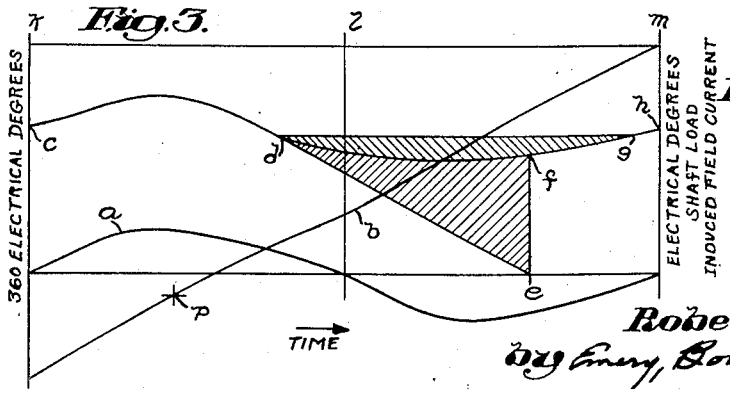
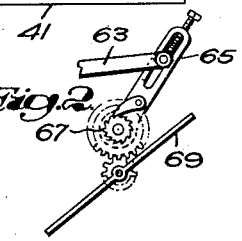
Inventor:
Robert C. Scott, Patented Jan. 17, 1939

2,144,549

UNITED STATES PATENT OFFICE

2,144,549

METHOD AND MEANS FOR STARTING SYNCHRONOUS MOTORS

Robert C. Scott, Cambridge, Mass., assignor to General Electric Company, a corporation of New York Application July 5, 1932, Serial No. 620,858

14 Claims. (Cl. 172—289)

This invention relates to new and improved methods and means for starting synchronous motors.

One of the objects of my invention is to provide a method and means whereby the angular position of the field structure relative to the moving wave of flux in the air gap at the instant at which direct-current excitation is applied to the field circuit, may be adjusted so as to insure most favorable conditions for pulling into step.

Another object is to provide a method and means whereby the application of direct-current excitation to the field circuit may be so timed as to occur at that point of the wave of induced field current at which most favorable conditions for pulling into step are obtained.

Another object is to provide a method and means whereby a synchronous motor may be pulled into step with a greater shaft load than would be otherwise obtainable.

Another object is to provide a method and means of limiting the armature current to a minimum value upon closure of the field switch.

Another object is to provide a method and means of relieving the revolving field structure and shaft of excessive mechanical strains and stresses during the starting period.

Other objects of my invention will appear more fully hereinafter, the novel combination of elements being pointed out in the appended claims.

My invention will be well understood by reference to the following description of the specific embodiment thereof shown by way of example in the accompanying drawing, wherein:—

Figure 1 is a view chiefly in the form of a diagram of a system illustrative of my invention showing by way of example, and not by way of limitation, its application to a synchronous motor of the type which is started by applying full voltage directly to the armature;

Fig. 2 is an enlarged detail; and

Fig. 3 is a graph showing a typical example of the variation with time of the angular displacement between the wave of air-gap flux and the field structure and of the induced field current, when the motor has approached or attained a speed suitable for applying voltage to the field circuit. It also shows the effects of closing the field switch at various instants during the cycle of variation of angle between the wave of air-gap flux and the field structure and of variation of the induced field current.

Synchronous motors, regardless of type, are usually started as induction motors with the field circuit short circuited through a starting resistance. The starting may be accomplished by first applying a reduced voltage to the armature winding and when the motor has accelerated to approximately half its rated speed to then apply full-line voltage to the armature windings. Or, full-line voltage may be initially applied to the armature winding without first applying a reduced voltage.

In either case, the motor is allowed to attain its maximum induction-motor speed before direct-current excitation is applied to the field winding and the starting resistance is disconnected.

After a synchronous motor has attained its maximum induction motor speed, if the direct-current excitation is applied to the field circuit at random the motor may pull into step without slipping more than one pole and run as a synchronous motor. It may continue to operate as an induction motor but with severe current and torque pulsations, or it may slip several poles and then pull into step.

Three methods of controlling the application of direct-current excitation to the field circuit of synchronous motors are commonly used.

In the first method the field switch is operated by hand or by electrical means controlled from a hand-operated switch and the instant that excitation voltage is applied is determined by observing the motor speed and the magnitude of the armature current as indicated by suitable instruments.

In the second method the field switch is operated automatically through the action of a relay which is adjusted to operate at a predetermined time after the initiation of the starting process, the time being usually taken as that required for the motor to attain maximum speed as an induction motor.

In the third method, means responsive to the electrical condition of the field winding are provided such that operation of the field switch may be effected under any of the following conditions, separately or together:

(a) When the motor attains a predetermined speed or slip, or when the frequency of the induced field current has decreased to a predetermined value.

(b) When the value of the current in the field circuit, or of the voltages across a reactor connected in the field circuit, attains or falls below a predetermined value.

(c) When the cycle of induced field current is of a certain direction of pulsation.

I find that with any of these methods of controlling the closure of the field switch, an increase can be effected in the amount of shaft load which can be carried and pulled into step and a reduction can be effected in the magnitude and duration of the current demand from the power supply system during the starting period, if the method and means of timing the instant of applying direct-current excitation to the field circuit in relation to the relative angular position of the moving wave of air-gap flux and the field structure, or in relation to the point on the wave of induced field current, which I here disclose, is employed.

It will be seen that the first and second mentioned commonly used methods of controlling the application of direct-current excitation to the field circuit do not provide any means of relating the instant of operation of the field switch to the angle between the wave of air-gap flux and the field structure, or in relation to any particular instant or point on the wave of induced field current. Also that the third mentioned commonly used method merely controls the operation of the field switch so that closure shall occur somewhere in a positive cycle of induced field current or somewhere in a negative cycle of induced field current.

Due to the unsatisfactory and highly irregular results obtained with starting methods as hitherto employed, it was to be deduced that there was some particular instant relative to the electrical condition of the system in which starting could be effected with optimum results, but the matter had not hitherto been fully understood. A mathematical solution has not been possible since the differential equation of motion of a synchronous motor could be solved only for limited values and with an expenditure of great effort so that it was impossible to arrive at results by calculation from which conclusions could be deduced. By mechanical integrating methods I have been able to investigate the subject and I have determined the importance of the angle between the moving wave of air-gap flux and the field structure, and have discovered, moreover, that by applying direct-current excitation to the field circuit of the motor with proper observance of this factor, unexpectedly high increases in efficiency as regards the shaft load carried as well as other improvements in operation during the starting period may be obtained.

The subject may be more fully understood by reference to Fig. 3 in which I have shown by way of example a typical graph showing for one particular motor the relative relations of the current induced in the field circuit, the angular displacement between the flux in the air gap and the field structure and the maximum value of shaft load which can be pulled into step when direct current excitation is applied at various instants. This graph, of course, represents one particular but typical motor and represents conditions at the time when the motor has obtained its maximum speed as an induction motor. More specifically, the curve $a$ shows the variation with time of the current induced in the field circuit. The curve $b$ shows the variation with time of the angular displacement between the flux in the air gap and the field structure. The curve $c, d, e, f, g, h$ shows the variation with time of the maximum value of shaft load which can be pulled into step when direct current excitation is applied at various instants. Since the curve $c, d, e, f, g, h$ represents maximum values of load, of coarse lesser values can be pulled into step, and we may therefore say that points that lie within the area bounded by the curve and horizontal axis are defined by values of shaft load and switching angle for which a motor will pull into step without swinging beyond the first region of motor action. Points lying within the shaded area bounded by $d, e, f$ define values of shaft load and switching angle for which a motor will pull into step in the next region of motor action after first passing through a complete region of generator action. Points within these two zones are the only ones for which a motor will pull into step with the steady-state operating angle not more than 360 electrical degrees from the initial switching angle. Points lying within the shaded area above line $d, f$ and $g$ define values of shaft load and switching angle for which a motor will eventually pull into step only after swinging through several regions of motor and generator action. Points not within these three zones define values of shaft load and switching angle for which a motor will never pull into step but will continue to run as an induction motor with severe current, torque and slip pulsations. It should be understood that the statements just made concerning these zones are statements of fact on the basis of the mathematical investigations referred to as well as experimental concurrence as illustrated by the particular example shown.

Referring again to the figure, in the zone bounded between the vertical lines $k$ and $l$ the direction of field current pulsation is opposite to the direction of excitation current. Also in the zone bounded by the vertical lines $l$ and $m$ the direction of field current pulsation is the same as the direction of excitation current. Now for the particular example represented by the typical curve shown it will be apparent from the figure that the maximum load which can be pulled into step will be obtained if direct current excitation is applied when the angular position of the field structure relative to the moving wave of flux in the air gap is approximately minus 30 electrical degrees, say at the point $p$. It will be observed further that if the excitation is applied merely when the cycle of induced field current is at a certain direction of pulsation, for instance, in the half cycle between the lines $k$ and $l$ in Fig. 3, it would be possible to switch the field at an instant such that the motor would swing through a number of cycles before pulling into step, even if the shaft load were less than the maximum load which could be pulled into step if excitation were applied at the desirable angle; for instance, in the example shown, at a time value slightly to the left of line $l$.

It should be borne in mind that the curves of Fig. 3 are exemplary merely and will differ greatly for different motors so that a device adaptable for use with different motors should have an easy and convenient means of changing the switching angle.

A practical installation and mechanical construction for applying the principles herein discussed is shown diagrammatically in Fig. 1 where by way of example merely I have shown a motor of the type which is started by applying full voltage directly to the armature. Referring to this figure of the drawing, I there show the motor having armature 5 supplied with alternating current through circuit breaker 7. The field 9, when the motor is in operation, is supplied with direct current through the main field switch 11. During starting it will be understood that the field switch 11 is open and the field winding is short-circuited through wire 13, starting resistance 15, field discharge switch 17 and wire 19.

The supply of current to the armature 5 energizes, through transformer 21, the coil of relay 23. This relay is provided with means for delaying its action until the motor obtains substantially its maximum speed as an induction motor, this herein being diagrammatically indicated by the showing of the dashpot 25. When the relay closes the upper bridge 27 thereof, this closes the circuit of the polarized relay device 29 seen at the lower right hand portion of the figure which is associated with the circuit of field 9 in a suitable manner, herein by means of a suitable shunt 31. Starting at this shunt, the circuit of the relay 29 is through wires 33, and 34, bridge 35 hereinafter to be referred to, wire 37, the bridge 27 of the relay 23, wire 39 to the relay 29, and from relay 29 through wire 41 back to the shunt 31.

The illustrative construction of relay 29 here disclosed by way of example comprises two sets of coils operating respectively the armatures 43 and 45, the arrangement being such that when a current of given polarity is flowing through the relay, the armatures tend to move in the same direction, that is, to the right or left as the case may be. The coil springs 47 and 49 tend respectively to hold armature 43 to the right in the dotted line position shown and armature 45 to the left in the dotted line position shown. When in the full line position shown in the figure, the armature 43 cooperating with an adjustable contact 51 closes the circuit between the terminal posts 53 and 55.

Armature 45, which may be provided at its end with a roll as shown, serves as a cam operating, when swung to the left from the full line position of the figure, to lift against the force of spring 57 the swinging arm 59 provided at its end with a pawl 61 which, when the arm is lifted, is in the path of armature 43 as it moves to the left from the dotted line to the full line position shown, the pawl being yieldably mounted to permit the armature to swing freely in the opposite direction. Suitable means may be provided for preventing armature 45 from being swung to the left too promptly by its spring 49, and I have herein shown an arm 63 extending therefrom adjustably connected (see Fig. 2) to a pawl-carrying lever 65 which cooperates with a ratchet wheel 67, the turning of which is braked by the vane 69. Thus armature 45 can move freely to the right, the pawl slipping over its ratchet, but on its return movement the ratchet is engaged, the vane must be turned against the resistance of the air and too rapid movement of the armature to the left is thus prevented. Prior to energization the armatures are, of course, in the dotted line position shown.

Assuming now that when the mechanism is energized the polarity of the current is such as to tend to pull both armatures toward the left, the armature 45 supports arm 59 in raised position and prevents movement of the armature 43 to the left to close its contact. On the next reversal of direction of the induced field current both armatures will be pulled toward the right. Armature 45 takes the full line position shown, permitting the arm 59 to drop. On the following reversal of polarity both armatures will oscillate to the left and armature 43 will return to the full line position to close the circuit before armature 45, the movement of which is braked by the vane 69, will interpose pawl 61 in its path.

This construction is an example of a mechanism which when energized will not act until the half cycle of desired polarity which begins after the time of energization. The importance of this is more accurately expressed by saying that it will not act during a half cycle of desired polarity which was commenced prior to its time of energization.

When relay 29 is operated in the manner described, current flows through it from the transformer 71 to the coil of relay 73, the circuit being as follows: wire 75 to relay 29, thence by wire 77 to the coil of the relay and back through wire 79. The relay 73 is small and fast in its operation and is preferably provided with a bridge 76 which is closed on the slightest impulse of the operating coil to provide a holding circuit to maintain the relay energized after the armature of the polarized relay oscillates to its original position. This holding circuit leads from wire 75 through branch 81, bridge 83, wire 85, bridge 76 just referred to, through the coil of relay 73 and back through wire 79. Actuation of this relay 73 also closes lower bridge 87, energizing the coil of relay 89, the circuit thereof being from wire 75, wire 91, the coil of the relay, wire 93, bridge 87, wire 79. The relay 89 is adjustably retarded in any suitable manner, as diagrammatically indicated herein by the showing of the dashpot 95. It will be understood that since the polarized relay acts substantially at the beginning of a half cycle, this adjustment permits the bridge 97 operated by the relay to be closed at the desired time during that half cycle to insure supply of direct current to the motor field at the desired angle.

Closing the bridge 97 energizes the operating coil 99 of the main field switch, the circuit leading from the positive line through that coil to wire 101, bridge 97 and wire 103 to the negative side. The field switch moving to the left under the influence of this coil first closes bridge 105 which forms a holding circuit for the coil 99 leading from the positive side of the line through the coil, through wire 107, bridge 105, wire 109, the lower bridge 111 of relay 23 and wire 113 to the negative side of the line.

Closing of the main field switch 11 applies direct current to the field and at substantially the same time, or slightly subsequently thereto, the arm 115 is rocked clockwise, opening field discharge switch 17 and breaking the circuit which includes field 9 and the starting resistance 15. This main field switch mechanism also opens bridge 35, thus deenergizing the polarized relay mechanism 29. The relay 89, when completely closed also opens bridge 83 shown immediately above the same, thus deenergizing the relay 73, the deenergizing of which in turn breaks the circuit of relay 89 at bridge 87.

The time required for field switch 11 to close after the coil 99 is energized depends on the design of the switch but may be considered to be constant. Also the time lag, if any, of the polarized relay mechanism 29 may be considered to be constant. So that for a given shaft load it is only necessary to introduce the proper time lag between the closing of the contacts of relay 29 at 43, 51, and the closing of the field switch contacts 11 in order for the field switch always to close at a desired angle. Such time lag may be effected by adjustment of the response of the relay 89. Given an installation and mechanism such as shown or its equivalent, the adjustment for the given motor may be readily effected after installation of the equipment by observing the relative magnitudes of both the armature and field currents during the starting period.

While I have shown one style of polarized relay and one style of time delay relay and a certain conventional circuit, it is apparent that this invention covers broadly any method or means of controlling any part or all of the pulling into step phenomena of a synchronous motor or synchronous machine of any type such as rotary converters, synchronous condensers and alternators, through an automatic means responsive to the electrical condition of the field circuit, for supplying direct-current excitation to the field circuit when the angular displacement between the wave of air-gap flux and the field structure and of the induced field current, has substantially a predetermined value.

While this invention has been described as applied to its use with a synchronous motor of the type which is started by applying full voltage directly to the armature, yet the method and means for pulling into step may be applied to synchronous motors of the type which is started by first applying reduced voltage to the armature.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a system of the class described, the combination with a synchronous motor having a field winding, means for running said motor as an induction motor, a relay mechanism to which the induced field current is applied when the motor attains substantially its maximum speed as an induction motor, and comprising a relay arranged to operate on a pulse wholly succeeding the pulse during which the current is applied, and means controlled by the relay to apply excitation current to the field comprising an adjustable timing mechanism.

2. In a system of the class described, the combination with a synchronous motor having a field winding, means for running said motor as an induction motor, a relay responsive to a unidirectional current only energized by the induced field current when the motor attains substantially its maximum speed as an induction motor, means to prevent effective operation of said relay during a pulse initiated prior to the energization thereof, and means responsive to the operation of said relay to apply excitation current to the field at a predetermined time thereafter.

3. In a system of the class described, the combination with a synchronous motor having a field winding, means for running said motor as an induction motor, a relay responsive to a unidirectional current only energized by the induced field current when the motor attains substantially its maximum speed as an induction motor, a detent normally opposing closing movement of said relay, means responsive to a determined polarity of the current to retract the detent, and means responsive to the closing of the relay to apply excitation current to the field at a predetermined time thereafter.

4. In a starting system for synchronous motors, in combination, a motor provided with field and armature windings, means for controlling the energization of the armature winding, a switch for controlling the energization of the field winding, a time-delay relay responsive to the voltage applied to the armature winding and disposed to prevent the energization of means for applying voltage to the field winding for a predetermined time interval after the application of voltage to the armature winding, an instantaneous relay disposed to be energized by the voltage induced in the field winding subsequent to the operation of the time-delay relay, said instantaneous relay being operatively responsive to current of a single polarity only, means responsive to the action of current of opposite polarity initiating the operation of said first means, and a second time-delay relay disposed to be energized subsequent to the energization of the second instantaneous relay for applying excitation voltage to the field winding to effect a maximum cumulative relation between the torque resulting from the application of voltage to the armature winding and the torque resulting from the application of voltage to the field winding.

5. In combination, an alternating current circuit, a synchronous machine having an armature winding connected to said circuit and a field winding, a source of excitation for said field winding, and means for connecting said source of excitation to said field winding at a predetermined optimum angular relation between said field winding and the air gap flux of said machine including timing means having a definite time of operation, means responsive to the induced current of slip frequency in said field winding for initiating the timing operation of said timing means at a definite angular relation between the field winding and the air gap flux of said machine, and means responsive to said timing means completing its timing operation for connecting said source of excitation to said field winding.

6. In combination, an alternating current circuit, a synchronous machine having an armature winding connected to said circuit and a field winding, a source of excitation for said field winding, and means for connecting said source of excitation to said field winding at a predetermined optimum angular relation between said field winding and the air gap flux of said machine including timing means having a definite time of operation, means responsive to a predetermined electrical condition of one of the windings of said machine for initiating the timing operation of said timing means at a definite angular relation between said field winding and the air gap flux of said machine, and means responsive to said timing means completing its timing operation for connecting said source of excitation to said field winding.

7. In combination, an alternating current circuit, a synchronous machine having an armature winding connected to said circuit and a field winding, a source of excitation for said field winding, and means for connecting said source of excitation to said field winding at a predetermined optimum angular relation between said field winding and the air gap flux of said machine including timing means having an adjustable definite time of operation, means responsive to a predetermined current condition in one of the windings of said machine when said machine is operating at substantially synchronous speed as an induction machine for initiating the timing operation of said timing means at a definite angular relation between said field winding and the air gap flux of said machine, and means responsive to said timing means completing its timing operation for connecting said source of excitation to said field winding.

8. In combination, an alternating current circuit, a synchronous machine having an armature winding connected to said circuit and a field winding, a source of excitation for said field winding, switching means for connecting said source of excitation to said field winding and having a definite operating time, and means for effecting the operation of said switching means so that said source of excitation is connected to said field winding at a predetermined optimum angular relation between the field winding and the air gap flux of said machine including timing means having an adjustable time of operation, means responsive to a predetermined electrical condition of said field winding for initiating the timing operation of said timing means at a definite angular relation between said field winding and the air gap flux, and means responsive to said timing means completing its timing operation for initiating the operation of said switching means.

9. In combination, an alternating current circuit, a synchronous machine having an armature winding connected to said circuit and a field winding, a source of excitation for said field winding, switching means for connecting said source of excitation to said field winding and having a definite operating time, and means for effecting the operation of said switching means so that said source of excitation is connected to said field winding at a predetermined optimum angular relation between the field winding and the air gap flux of said machine including timing means having an adjustable time of operation, means responsive to the induced current in said field winding for initiating the operation of said timing means at a definite point in the slip cycle, and means responsive to said timing means completing its timing operation for initiating the operation of said switching means.

10. In combination, an alternating current circuit, a synchronous machine having an armature winding connected to said circuit and a field winding, a source of excitation for said field winding, switching means for connecting said source of excitation to said field winding and having a definite operating time, and means for effecting the operation of said switching means so that said source of excitation is connected to said field winding at a predetermined optimum angular relation between the field winding and the air gap flux of said machine including timing means having an adjustable time of operation, polarity responsive means responsive to the induced current in said field winding for initiating the operation of said timing means at a definite point in a definite half cycle of slip of said machine, and means responsive to said timing means completing its timing operation for initiating the operation of said switching means.

11. In combination, an alternating current circuit, a synchronous machine having an armature winding connected to said circuit and a field winding, a source of excitation for said field winding, switching means for connecting said source of excitation to said field winding and having a definite operating time, and means for effecting the operation of said switching means so that said source of excitation is connected to said field winding at a predetermined optimum point of the wave of induced field current when said motor is operating at a predetermined subsynchronous speed including timing means having an operating time equal to the difference between the time it takes the induced field current to change from a definite point on said wave to said optimum point at said predetermined subsynchronous speed and the operating time of said switching means, and means responsive to the electrical condition of one of the windings of said machine for initiating the operation of said timing means at said definite point of said wave of induced field current at said predetermined subsynchronous speed.

12. In combination, an alternating current circuit, a synchronous machine having an armature winding connected to said circuit and a field winding, a source of excitation for said field winding, switching means for connecting said source of excitation to said field winding and having a definite operating time, and means for effecting the operation of said switching means so that said source of excitation is connected to said field winding at a predetermined optimum point of the wave of induced field current when said motor is operating at a predetermined subsynchronous speed including timing means having an operating time equal to the difference between the time it takes the induced field current to change from a definite point on said wave to said optimum point at said predetermined subsynchronous speed and the operating time of said switching means, and means responsive to the electrical condition of said field winding for initiating the operation of said timing means at said definite point of said wave of induced field current at said predetermined subsynchronous speed.

13. In combination, an alternating current circuit, a synchronous machine having an armature winding and a field winding, switching means for connecting said armature winding to said circuit, a source of excitation for said field winding, and means for connecting said source to said field winding at a predetermined optimum point on the wave of induced field current when said machine is operating subsynchronously as an induction machine including timing means having a definite time of operation, means responsive to an electrical condition of said machine for initiating the timing operation of said timing means at a definite point on the wave of induced field current, means responsive to said timing means completing its timing operation for connecting said source of excitation to said field winding, and other timing means controlled by said switching means for rendering said electrical condition responsive means operative to control said first mentioned timing means after said armature winding has been connected to said circuit for a predetermined time.

14. In combination, an alternating current circuit, a synchronous machine having an armature winding and a field winding, switching means for connecting said armature winding to said circuit, a source of excitation for said field winding, and means for connecting said source to said field winding at a predetermined optimum point on the wave of induced field current when said machine is operating subsynchronously as an induction machine including timing means having a definite time of operation, means responsive to the induced field current for initiating the timing operation of said timing means at a definite point on the wave of induced field current, means controlled by said switching means for rendering said induced field current responsive means operative to control said timing means after said armature winding has been connected to said circuit for a predetermined time, and means responsive to said timing means completing its timing operation for connecting said source of excitation to said field winding.

ROBERT C. SCOTT.